Sept. 28, 1943.    R. D. CLEMSON    2,330,680
LAWN MOWER
Filed Feb. 12, 1942    2 Sheets-Sheet 1

INVENTOR
RICHARD D. CLEMSON
BY
ATTORNEYS

Sept. 28, 1943.   R. D. CLEMSON   2,330,680
LAWN MOWER
Filed Feb. 12, 1942   2 Sheets-Sheet 2
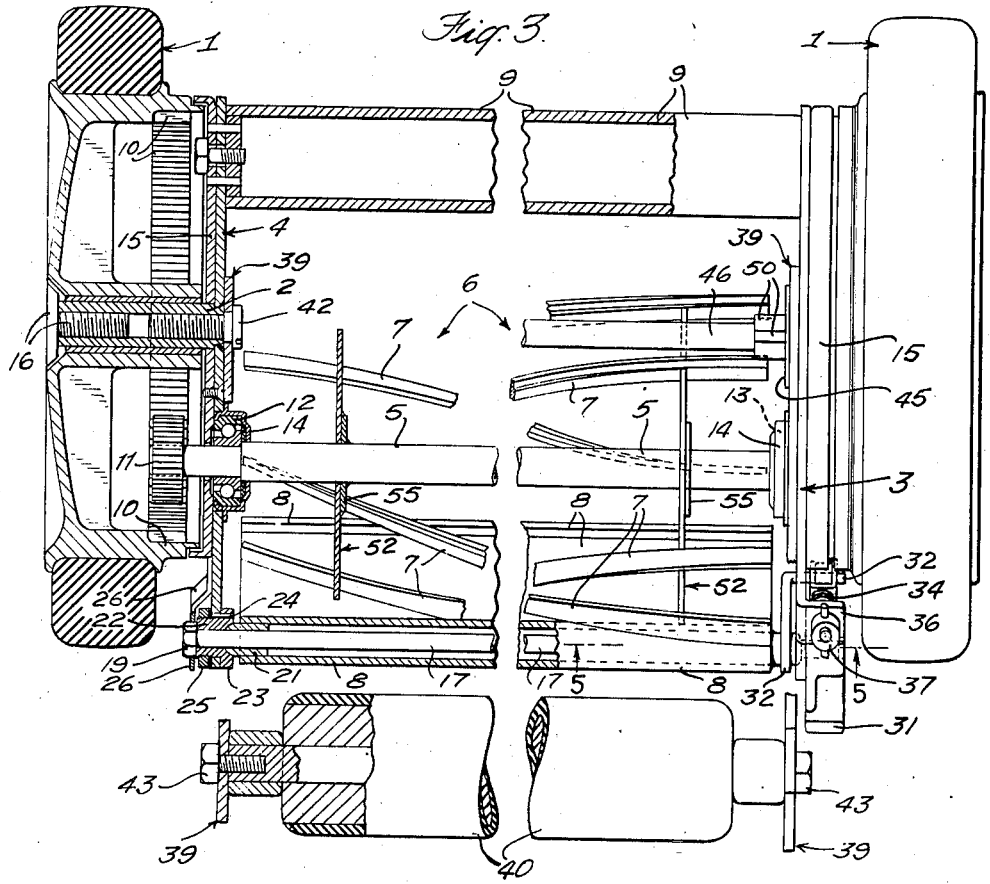
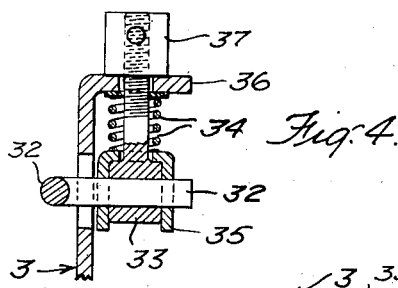
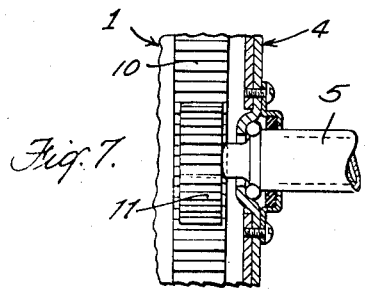
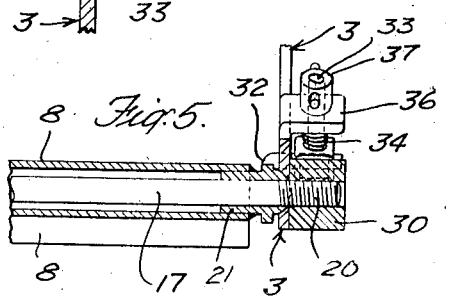
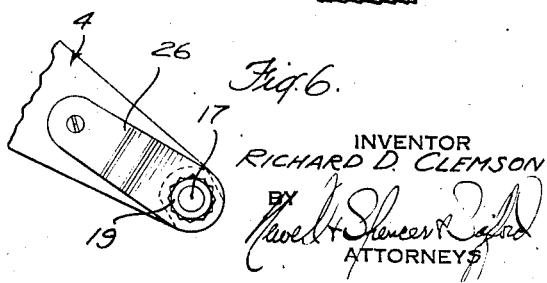
INVENTOR
RICHARD D. CLEMSON
ATTORNEYS Patented Sept. 28, 1943

2,330,680

UNITED STATES PATENT OFFICE 2,330,680

LAWN MOWER

Richard D. Clemson, Middletown, N. Y., assignor to Clemson Bros., Inc., Middletown, N. Y., a corporation of New York Application February 12, 1942, Serial No. 430,589

8 Claims. (Cl. 56—249)

This invention relates to lawn mowers.

It is one object of my invention to provide a self-adjusting mounting for the cutter shaft of a rotary lawn mower of such nature that a particularly effective bearing action may be had at all times.

It is another object of my invention to provide means for mounting the bed knife in a lawn mower.

It is another object of my invention to provide simple, effective and readily operable means for securely mounting certain of the parts of a lawn mower.

Quiet and efficient operation of a rotary reel type mower depends to a very great extent upon accurate alignment of the cutter reel axis and the cutting edge of the bed knife. Such alignment may be readily established when the mower is first assembled at the factory, but experience has shown that it is extremely difficult to maintain in the face of wear, and the need for compensating adjustments by the user, who may have little skill and only the simplest tools. I have found that perfect alignment can only be assured with rigid mounting of the bed knife and perfect maintenance of the reel shaft bearings.

It is, therefore, highly desirable that the bearings for the cutter reel shaft in a lawn mower shall fit tightly during operation, and it is also desirable that the bed knife be securely clamped in place. It is, nevertheless, essential that adjustment of these parts to compensate for wear may be readily performed by unskilled operators. With the foregoing and other considerations in view, the present invention contemplates the provision of radial-thrust type (e. g., cup and cone) bearings, of resilient end frame members and of simple, effective and readily operable means for stressing these frame members against their resiliency to impose a resilient adjusting force to tighten the thrust bearings for the cutter shaft and to firmly clamp the bed knife in place.

Although, in this specification and the accompanying drawings, I have shown and described a preferred embodiment of my invention and various modifications thereof and have suggested various alternatives, these are not intended to be exhaustive nor limiting of the invention, but on the contrary are given for the purpose of illustrating the invention and instructing others in the principles thereof and the best manner of utilizing the invention in practical use, in order that others may be enabled to modify and apply it in numerous forms each as may be best suited to the conditions and requirements of any particular use.

In the drawings:

Fig. 3 is a plan view partly in section taken on line 3—3 of Fig. 2 and with the central portion of the mower broken away;

Fig. 4 is an enlarged section taken on line 4—4 of Fig. 2;

Fig. 5 is a fragmentary sectional view through the bed knife taken on line 5—5 of Figs. 2 and 3;

Fig. 6 is a fragmentary view in side elevation of the locking spring device at the end of the bed knife; and Fig. 7 is a fragmentary sectional view showing a modified reel bearing structure.

Figure 1:
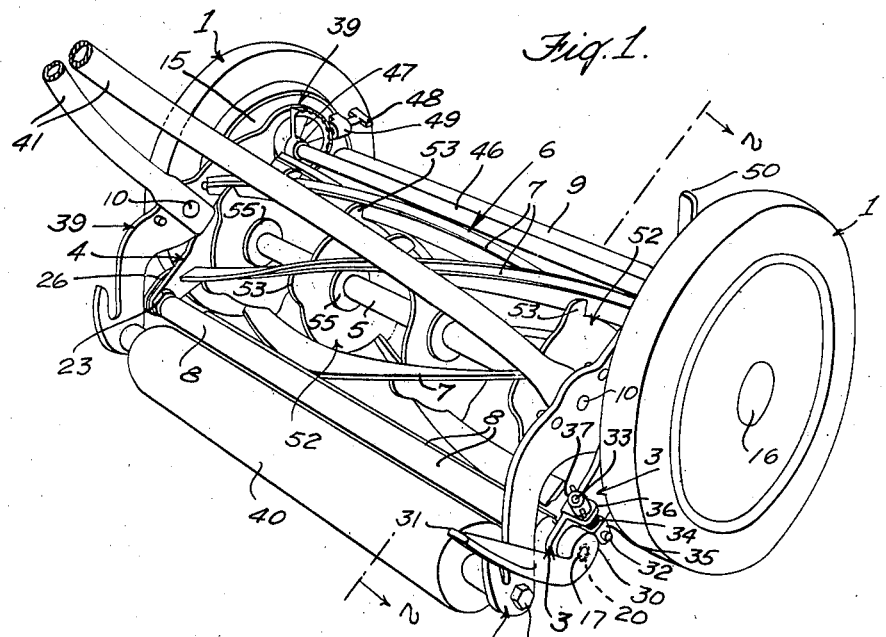
Fig. 1 is a perspective view taken from the rear right-hand side of the mower.

The particular form of construction exemplified in the drawings comprises ground wheels 1 mounted on studs or stud axles 2 formed respectively on end frame members 3 and 4. These end frames serve also to mount the shaft 5 of the reel 6 carrying cutters 7 and to mount the bed knife 8. The frame members 3 and 4 are interconnected by means of a tie-tube 9 as well as by the bed knife structure more fully explained below; and these parts give a rigid frame.

In the present instance, each ground wheel carries an internal ring gear 10 with which a pinion 11 fixed on the shaft 5 meshes to drive the cutter reel from the wheel. The shaft 5 is rotatably mounted on the end frame members by cup and cone bearings 12 and 13 of the ball or taper roller type, the cup bearings 12 may, as shown in Fig. 7, be formed in the end frame members by a stamping operation with subsequent accurate grinding and heat treatment or case hardening, and the cone bearings 13 may be forged or machined on the shaft 5 or in a stub shaft insert if a tubular shaft is used with similar grinding and heat treatment or case hardening; but in practical production it will usually be more convenient to use standard unit bearings, as shown in Fig. 1 of the drawings, held in place by stamped cups 14 fitted into holes in the side frames 3 and 4 and engaging in recess at the edge of each hole so as to be held in place by the axial pressure on the bearing.

The studs 2 are hollow and internally threaded at their outer ends, and ground wheels are held in place by screws 16 screwed into the studs 2. A dust cover 15 carried on each end frame member is provided between it and the ground wheel adjacent thereto. The end frame members 3 and 4 are resilient steel advantageously stamped from stiff steel sheet.

The bed knife 8 is, in the present instance of hollow construction and is provided at each end with tubular bearing projections 21, the external faces of which are of spherical form. This bed knife is rotatably carried on a rod 17 which extends through holes in the rear portions of the end frame members, and is formed with a hexagonal head 19 disposed outside one of the end frame members, and with a threaded portion 20 extending beyond the other of the end frame members. The bed knife itself is disposed between the rear ends of the end frame members, the hemispherical bearing projection 21 at one end being received in a corresponding hemispherical recess in the end of the frame member 3, and the hemispherical projection at the other end of the frame member 4 being received in a female hemispherical bearing at the inner end of a headed eccentric bushing 23 fitted on the rod 17 and through a hole in the end frame member 4. The stem 22 is threaded and a nut 25 on its outer end holds it securely on the end frame portion 4. By rotation of this eccentric the bed knife edge is adjusted at the factory to perfect alignment with the reel axis after which it is preferably dowelled at 24 to lock it in place and assure that the adjustment will remain permanent. A resilient clip 26 is attached to the member 4 and fitted over the hexagonal head 19 to prevent rotation of the rod 17.

Figure 2:
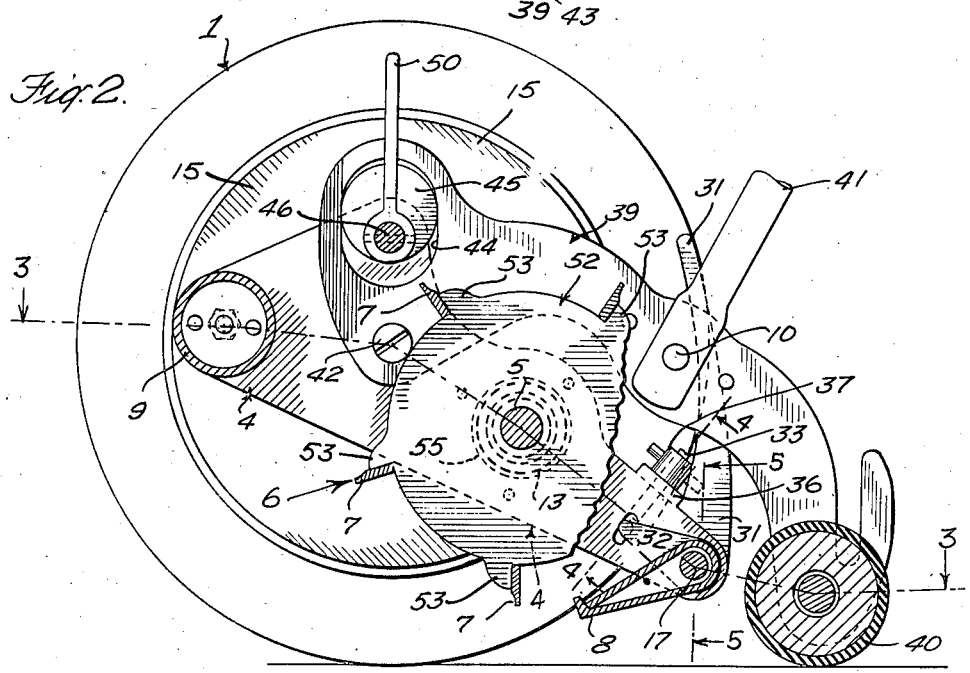
Fig. 2 is a view in transverse section on an enlarged scale taken on line 2—2 of Fig. 1.

The threaded portion 20 of the rod 17 is screwed into an internally threaded hub 30 of a lever 31. Thus, by movement of the lever 31 from its released position as shown in Figure 1 to its clamped position as shown in Figure 2, the hub of the lever 31 is moved axially inward along the rod 17, and the rear end portions of the end frame members 3 and 4 are drawn together against their resiliency so as to clamp the bed knife firmly in position. At the same time, the resilient sheet metal frame members, being secured at their opposite ends to the tie tube 9 tend to draw together near their central portion and, being restrained by the reel shaft bearings 12—13, are resiliently flexed sufficiently to assure an end pressure on the bearings 12—13 assuring perfectly maintained alignment of the shaft 5 and taking up automatically any wear in the bearings 12—13. This resilient mounting of the bearings also gives protection to the blades against injury by hard obstructions becoming engaged between them, since the bearings can yield to an appreciable extent to relieve the impact against such obstruction.

Near the forward edge of the bed knife adjacent the frame member 3 there is provided a crank 32 on which is mounted an eye bolt 33 on the threaded end of which is a spring 34 bearing downwardly against a yoke 35 and upwardly against an ear 36 which is formed on the frame member 3 and through which the threaded end of the eye bolt extends. By rotating a thumb nut 37 on the upper threaded end of the eye bolt the position of the cutter knife is suitably adjusted. This adjustment may be readily effected at any time by drawing back the lever 31 and thus relieving the clamping pressure on the spherical bearings 21 sufficiently to permit rotation of the bed knife but without entirely relieving the pressure on the reel shaft bearings. The proper adjustment for the thumb screw is then made and the lever 31 is thrust forward again to reclamp the bed knife.

In the present example a secondary frame 39 is used for mounting the ground roll 40 and the handle 41 in accordance with the invention and structure described and claimed in my copending application Serial No. 386,029, filed March 31, 1941. The side members 39 of this secondary frame are pivotally mounted on the axis of the ground wheels by means of studs 42 threaded into the hollow studs 2, and are secured, by means of bolts 43, to a fixed shaft on which the ground roll is rotatably mounted. Each secondary frame member is formed with a generally elliptical opening 44 in which is disposed an adjustable cam 45 eccentrically mounted on a cam shaft 46. The shaft 46 carries a grooved calibrated segment 47 against which a set screw 48 mounted in a lug 49 on the end frame member 4 is adapted to be moved. Rotation of the shaft 46 is secured by means of a lever 50 attached thereto. As will be understood the use of this secondary frame and the special mounting and adjusting means for the ground roller and handle are not necessary to the invention claimed herein and types of mountings may be employed without departing from the invention in its broader aspects, or, if desired, the ground roll may be omitted entirely and the invention applied to the frame of a cutter unit, e. g., as set forth in my copending application Serial No. 258,362, filed February 25, 1939.

As shown, the fly knife blades 7 are secured to the shaft 5 by sheet metal spiders 52 formed with ears 53 each received with clearance in corresponding holes provided in the knives 7 and secured therein by brazing or welding. For convenience in assembly these ears may have their ends swaged or upset sufficiently to hold the knife loosely but substantially accurately positioned during the brazing or welding operation. The spiders themselves may be held to the shaft 5 by shrinking thereon; in order to increase the area of engagement with the shaft a washer 55 may be spot welded or riveted to the spider before the hole for the shaft is reamed to size.

What I claim is:

1. A lawn mower comprising a bed knife, a cutter reel having a shaft, resilient end frame members, radial-thrust type bearings between said shaft and positioned in a central area of said frame members for rotatably mounting said shaft, a substantially rigid connection between said end frame members spaced to one side of said bearings adapted to hold said frame members lightly pressed against said bearings, and clamp means engaging said frame members at points spaced to the other side of said bearings and operable to clamp frame members together against their resiliency whereby to impose an axial stress on said bearings to maintain alignment of the shaft and take up wear in the bearings.

2. A lawn mower comprising a cutter reel having a shaft, resilient end frame members, radial-thrust type bearings between said shaft and frame members for rotatably mounting said shaft, a substantially rigid connection between said end frame members spaced to one side of said bearing adapted to hold said frame members lightly pressed against said bearings, a bed knife mounted on said end frame members spaced on the opposite side of said bearings and being shorter than the space between adjacent portions of the end frame members when unstressed, and a clamp associated with said bed knife for stressing said frame members against their resiliency to assure a firm maintenance of coaxial relation in said bearings.

3. A lawn mower comprising a cutter reel having a shaft, a resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place.

4. A lawn mower comprising a cutter reel having a shaft, resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place, said clamp including a rod extended through the bed knife and side frames and having a threaded portion extending beyond one of said end portions and a lever threaded on said extending portion.

5. A lawn mower comprising a cutter reel having a shaft, resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place, a rod provided with means engaging one of said end frame members adjacent one end of the bed knife and with a portion thereof extending beyond the other of said end frame members adjacent the other end of the bed knife, and clamping means on said extending portion to clamp said end frame members onto the ends of the bed knife.

6. A lawn mower comprising a cutter reel having a shaft, resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place, a rod provided with a head at one end engaging one of said end frame members adjacent one end of the bed knife and with a threaded portion extending beyond the other of said end frame members adjacent the other end of the bed knife, and an internally threaded clamping lever on said threaded portion to clamp said end frame members onto the ends of the bed knife, and means releasably locking said head to the end frame member adjacent the head to prevent turning of said rod during the operation of the clamping lever.

7. A lawn mower comprising a cutter reel having a shaft, resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place, a rod extending longitudinally through and rotatably supporting said bed knife and provided with means engaging one of said end frame members adjacent one end of the bed knife and with a portion thereof extending beyond the other of said end frame members adjacent the other end of the bed knife, and clamping means on said extending portion to clamp said end frame members onto the ends of the bed knife.

8. A lawn mower comprising a cutter reel having a shaft, resilient sheet metal end frame members, cup-and-cone bearings providing radial-thrust bearing positioned in a central area of said frame members for rotatably mounting said shaft on said frame members, a substantially rigid connection between said end frame members spaced to one side of said bearings adapted to hold said frame members lightly pressed against said bearings, a bed knife mounted between said frame members at a position spaced on the opposite side of said bearings and being shorter than the space between adjacent portions of the end frame members when unstressed, and a clamp for stressing said frame members together against their resiliency on the line of said bed knife to assure a firm maintenance of coaxial relation in said bearings and to clamp said bed knife firmly in place, a rod extending longitudinally through and rotatably supporting said bed knife and provided with a head at one end engaging one of said end frame members adjacent one end of the bed knife and with a threaded portion extending beyond the other of said end frame members adjacent the other end of the bed knife, a lever threaded on said threaded portion and movable from a projecting release position to a relatively protected position to stress said end frame member together and to firmly clamp said bed knife, a projection on said bed knife at one side of said rod, a lug on one of said frame members, a spring engaged between said projection and said lug, a threaded link engaging one of the latter members and having its threaded end extended through the other, and an adjusting nut on said threaded end.

RICHARD D. CLEMSON.